United States Patent
Ko et al.

(10) Patent No.: US 11,468,858 B2
(45) Date of Patent: Oct. 11, 2022

(54) MULTI-DISPLAY PANEL DISPLAY DEVICE AND MULTI-DIRECTIONAL DRIVING METHOD OF THE SAME

(71) Applicant: LG Display Co., Ltd., Seoul (KR)

(72) Inventors: Byunggwan Ko, Paju-si (KR); Hongbin Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/109,743

(22) Filed: Dec. 2, 2020

(65) Prior Publication Data
US 2021/0174759 A1    Jun. 10, 2021

(30) Foreign Application Priority Data
Dec. 10, 2019 (KR) .................. 10-2019-0163658

(51) Int. Cl.
*G09G 3/36* (2006.01)
*G09G 3/3266* (2016.01)
*G09G 3/3275* (2016.01)
*G09G 3/3225* (2016.01)

(52) U.S. Cl.
CPC ......... *G09G 3/3677* (2013.01); *G09G 3/3225* (2013.01); *G09G 3/3266* (2013.01); *G09G 3/3275* (2013.01); *G09G 3/3688* (2013.01); *G09G 2300/026* (2013.01); *G09G 2310/0283* (2013.01); *G09G 2310/08* (2013.01); *G09G 2320/02* (2013.01)

(58) Field of Classification Search
CPC .. G09G 3/3677; G09G 3/3688; G09G 3/3275; G09G 3/3266; G09G 3/3225; G09G 2320/02; G09G 2310/08; G09G 2310/0283; G09G 2300/026
See application file for complete search history.

(56) References Cited

U.S. PATENT DOCUMENTS

2006/0012555 A1*  1/2006  Tokumura ............ G09G 3/3648
                                                    345/98
2007/0035500 A1*  2/2007  Takeo .................. G09G 3/3688
                                                    345/98
(Continued)

FOREIGN PATENT DOCUMENTS

KR  10-2006-0001667 A   1/2006
KR  10-2018-0126732 A  11/2018

*Primary Examiner* — Chad M Dicke
(74) *Attorney, Agent, or Firm* — Fenwick & West LLP

(57) ABSTRACT

A display device and a driving method of the same are proposed, the display device including first and second display panels displaying one image in a division manner; first and second data drivers supplying data voltages to the first and second display panels, respectively; first and second scan drivers supplying scan signals to the first and second display panels, respectively; and first and second timing controllers controlling the first and second data drivers and the first and second scan drivers, respectively, wherein the first data driver latches a first data signal output from the first timing controller in a first direction and converts the first data signal to a first data voltage to be outputted, and the second data driver latches a second data signal output from the second timing controller in a second direction and converts the second data signal to a second data voltage to be outputted.

11 Claims, 23 Drawing Sheets

(56) References Cited

U.S. PATENT DOCUMENTS

| | | | |
|---|---|---|---|
| 2013/0100181 A1* | 4/2013 | Choe | G09G 3/3614 345/691 |
| 2014/0118418 A1* | 5/2014 | Kondo | G09G 3/20 345/690 |
| 2016/0180812 A1* | 6/2016 | Choi | G06F 3/1446 345/204 |
| 2017/0098421 A1* | 4/2017 | Son | G06F 3/1446 |
| 2017/0309243 A1* | 10/2017 | He | G09G 3/36 |

* cited by examiner

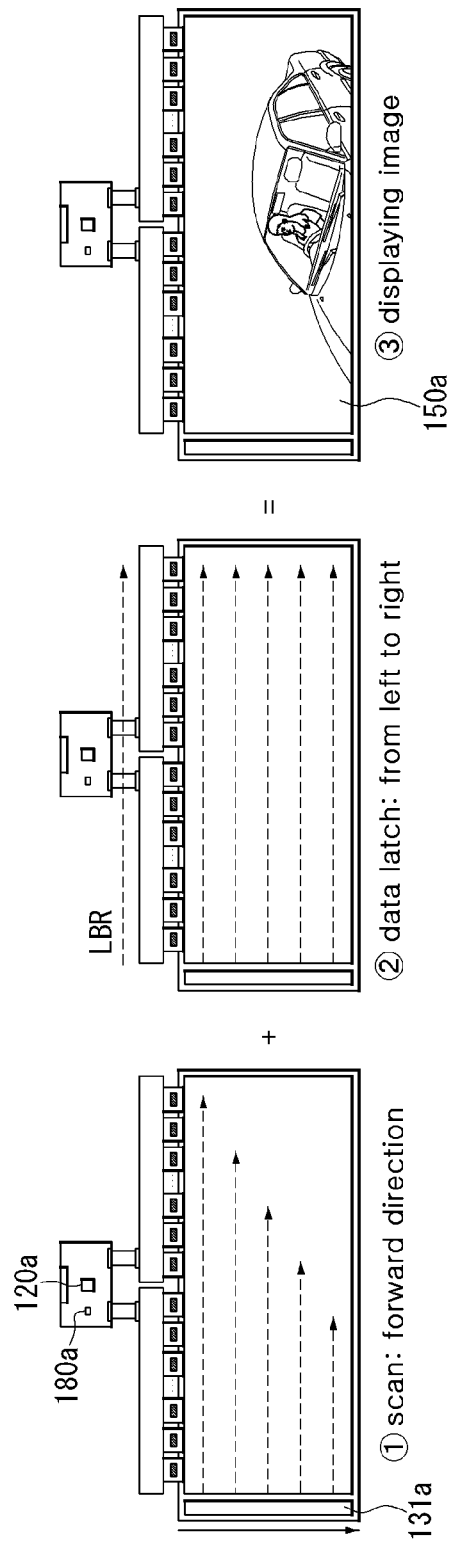

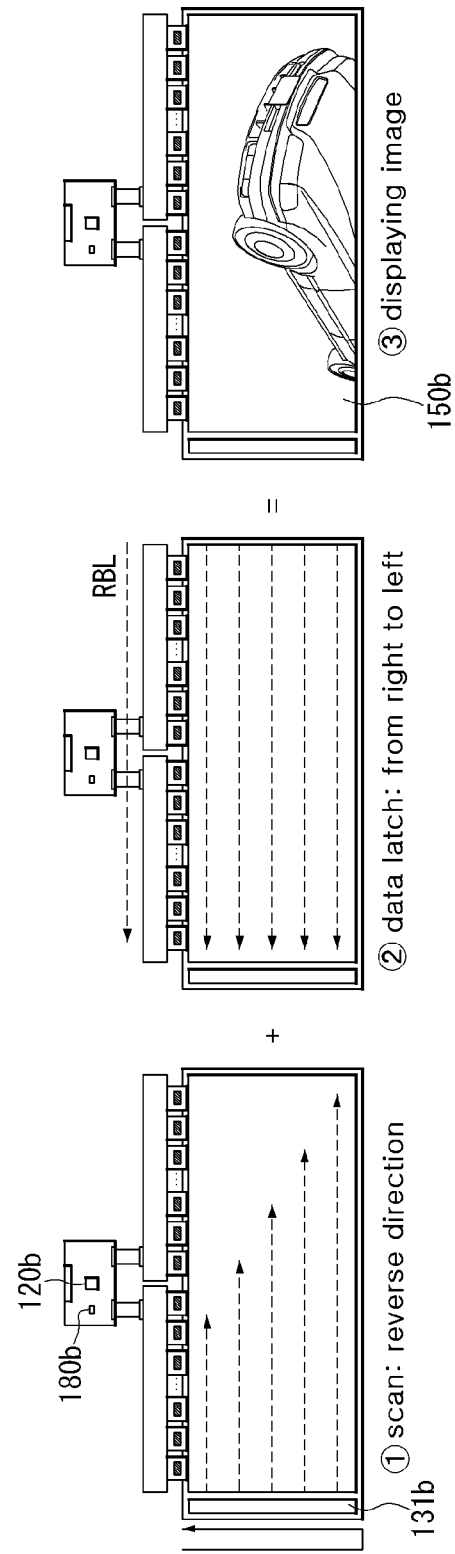

FIG. 18A
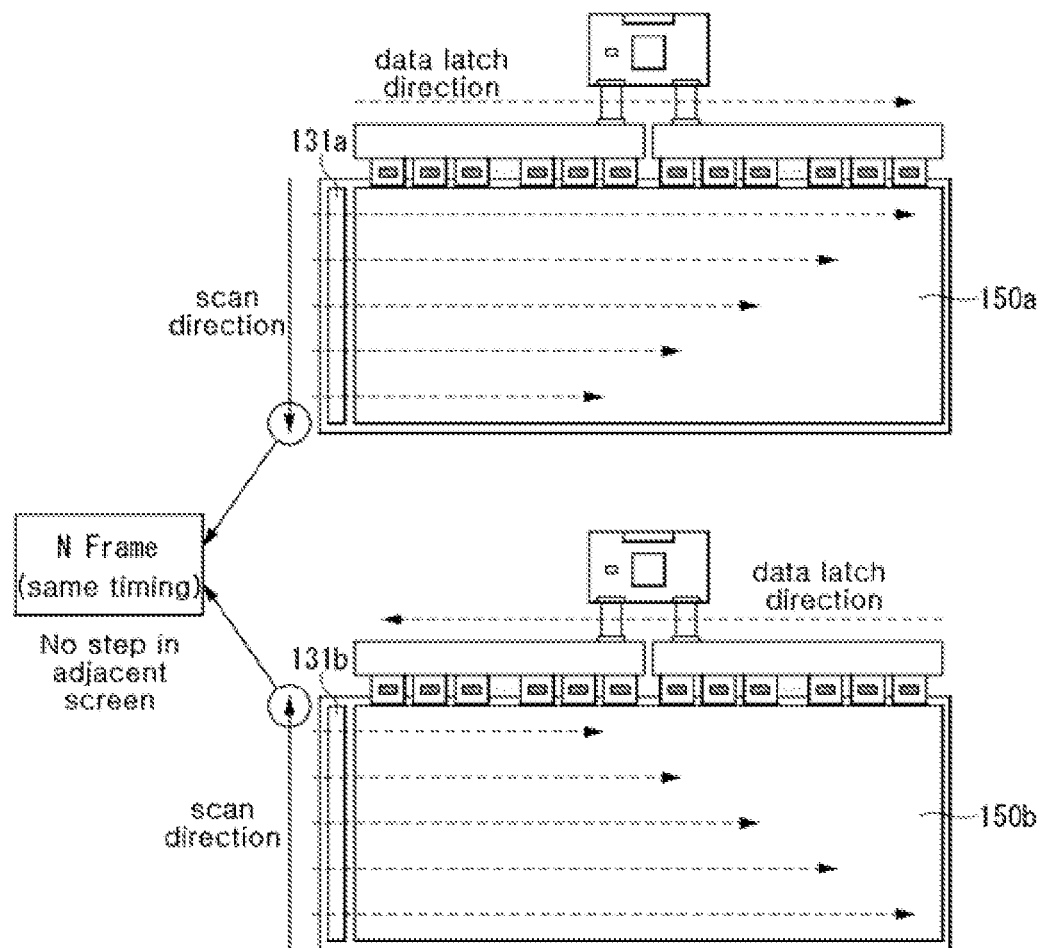
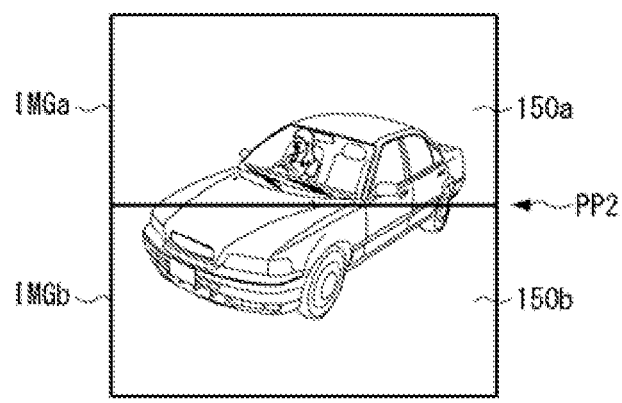
FIG. 18B

FIG. 19A
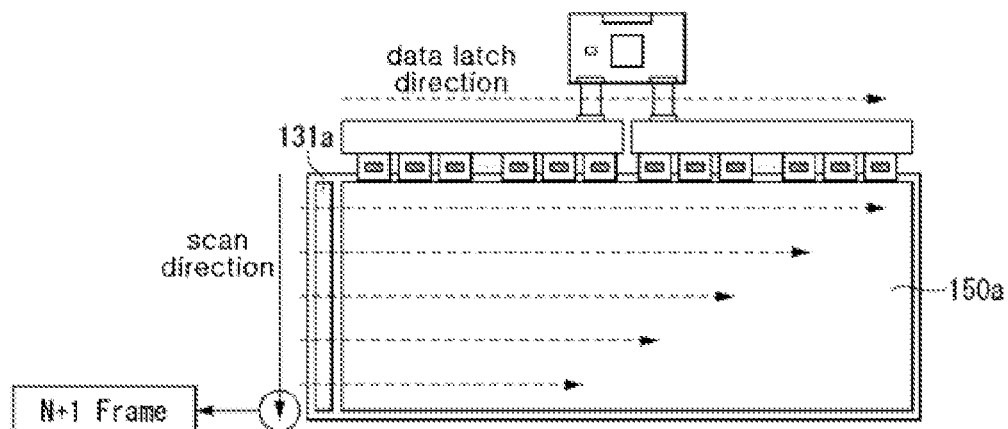
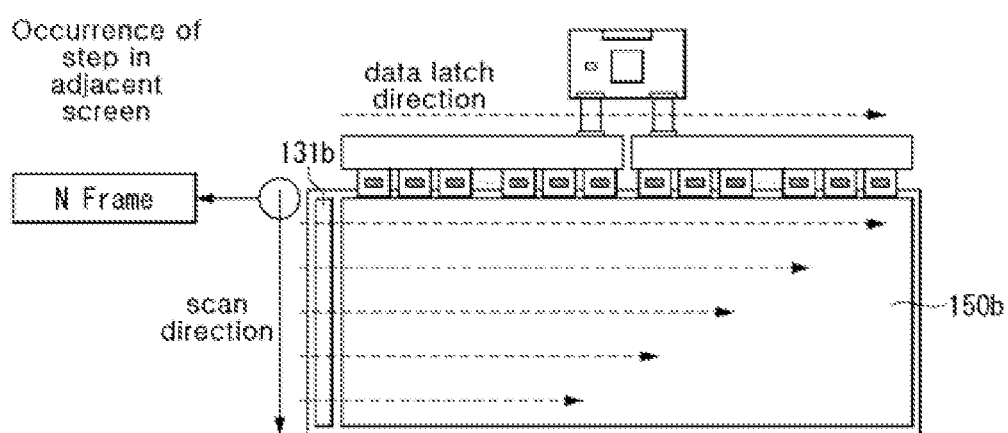
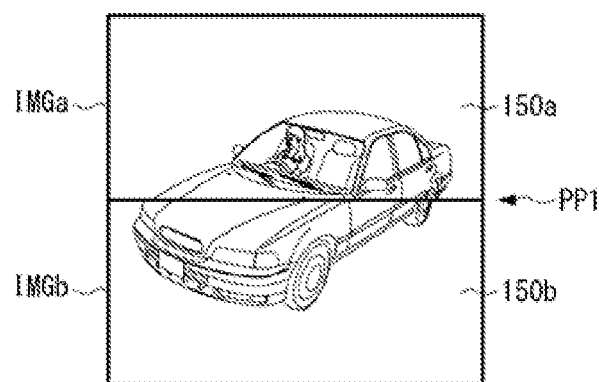
FIG. 19B

MULTI-DISPLAY PANEL DISPLAY DEVICE AND MULTI-DIRECTIONAL DRIVING METHOD OF THE SAME

CROSS-REFERENCE TO RELATED APPLICATIONS

This application claims the benefit of Republic of Korea Patent Application No. 10-2019-0163658 filed on Dec. 10, 2019, each of which is incorporated by reference in its entirety.

BACKGROUND

Field of the Disclosure

The present disclosure generally relates to a display device and a driving method of the same.

Description of the Background

With the development of information technology, the market for a display device that is a connection medium between a user and information is growing. Accordingly, the use of display devices such as an organic light emitting display (OLED), a quantum dot display (QDD), a liquid crystal display (LCD), and a plasma display panel (PDP) is increasing.

Some of the display devices described above, for example, a liquid crystal display device or an organic light emitting display device, include a display panel including a plurality of sub-pixels arranged in the form of a matrix, a driver outputting a driving signal to drive the display panel, and a power supply unit generating power to be supplied to the display panel or the driver. The driver includes a scan driver supplying a scan signal (or gate signal) to the display panel, a data driver supplying a data signal to the display panel, and the like.

In the display devices as described above, when a driving signal, such as a scan signal and a data signal, is supplied to sub-pixels formed on the display panel, the selected sub-pixel transmits light or emits light directly, thereby displaying an image.

SUMMARY

Various embodiments of the present disclosure are to reduce the occurrence of an image step between the upper image and the lower image, thereby improving the display quality, when implementing a video wall (or multi-vision) display device that divides a single image into a plurality of images and then displays the resulting on a plurality of display panels.

A display device according to an embodiment of the present disclosure includes first and second display panels displaying one image in a division manner; first and second data drivers supplying data voltages to the first and second display panels, respectively; first and second scan drivers supplying scan signals to the first and second display panels, respectively; and first and second timing controllers controlling the first and second data drivers and the first and second scan drivers, respectively, wherein the first data driver latches a first data signal output from the first timing controller in a first direction and then converts the first data signal to a first data voltage to be outputted, and the second data driver latches a second data signal output from the second timing controller in a second direction opposite to the first direction and then converts the second data signal to a second data voltage to be outputted.

The first scan driver may output the scan signal in a forward direction, and the second scan driver may output the scan signal in a reverse direction.

The first and second scan drivers may have scan directions depending on logic states of first and second scan direction change signals supplied from the outside.

The first and second scan drivers may include first and second scan direction control lines to which the first and second scan direction change signals are applied, respectively, in which the first and second scan direction control lines may be formed with two lines that are spaced from each other and then interconnected to each other at one side, thereby having a U-shape.

The first and second data drivers may have latch directions of data signals depending on the first and second latch direction change signals supplied from the first and second timing controllers.

A first image and a second image displayed on an interface between the first display panel and the second display panel may be completely displayed for a same frame.

The first display panel and the second display panel may be disposed vertically adjacent to each other.

A display device according to an embodiment of the present disclosure includes at least two display panels displaying one image in a division manner; at least two timing controllers outputting a first data signal and a second data signal for displaying the one image in a division manner on each of the at least two display panels; at least two data drivers converting the first data signal and the second data signal output from the at least two timing controllers into a first data voltage and a second data voltage to be output to each of the at least two display panels; and at least two scan drivers applying a first scan signal and a second scan signal so that the first data voltage and the second data voltage are separately applied to each of the at least two display panels, wherein a first scan driver outputs the first scan signal in a forward direction, and the second scan driver outputs the second scan signal in a reverse direction, in the at least two scan drivers, and a first data driver latches the first data signal in a first direction and outputs the latched data signal, and a second data driver latches the second data signal in a second direction opposite to the first direction and outputs the latched data signal, in the at least two data drivers.

A first image and a second image displayed on an interface between the at least two display panels may be completely displayed for a same frame.

The at least two scan drivers may have scan directions depending on logic states of first and second scan direction change signals output from at least two power supply units.

A separate signal line for changing a latch direction of the data signal may be disposed between the at least two data drivers and the at least two timing controllers.

A driving method of a display device according to an embodiment, the method including outputting a first data signal and a second data signal to display one image in a division manner on each of at least two display panels; converting the first data signal and the second data signal into a first data voltage and a second data voltage and thus outputting the first data voltage and the second data voltage to the at least two display panels, respectively; and outputting a scan signal to each of the at least two display panels so that the first data voltage and the second data voltage are separately applied to each of the at least two display panels, wherein the outputting of the first data voltage and the second data voltage is provided so that the first data signal is latched in a first direction and then converted into the first data voltage to be output to the first display panel, and the second data signal is latched in a second direction opposite to the first direction and then converted to the second data voltage to be output to the second display panel.

The outputting of the scan signal may be provided so that the scan signal includes a forward scan signal and a reverse scan signal, in which the forward scan signal is applied to the first display panel, and the reverse scan signal is applied to the second display panel.

A first image and a second image to be displayed on an interface between the at least two display panels may be completely displayed for a same frame.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the invention. In the drawings:

FIGS. 16 and 17 are views illustrating latch directions of data voltages for two display panels are different according to one embodiment.

FIGS. 18A and 18B are views illustrating an example of implementation of a video wall display device using an image control method according to an embodiment of the present disclosure;

FIGS. 19A and 19B are views illustrating an implementation of a video wall display device without using an image control method according to an embodiment of the present disclosure;

DETAILED DESCRIPTION

Hereinafter, various embodiments of the present disclosure will be described with reference to the accompanying drawings.

With the development of information technology, the market for a display device that is a connection medium between a user and information is growing. Accordingly, the use of display devices such as an organic light emitting display (OLED), a quantum dot display (QDD), a liquid crystal display (LCD), and a plasma display panel (PDP) is increasing.

Some of the display devices described above, for example, a liquid crystal display device or an organic light emitting display device, include a display panel including a plurality of sub-pixels arranged in the form of a matrix, a driver outputting a driving signal to drive the display panel, and a power supply unit generating power to be supplied to the display panel or the driver. The driver includes a scan driver supplying a scan signal (or gate signal) to the display panel, a data driver supplying a data signal to the display panel, and the like.

When the display device as described above is supplied with a driving signal such as a scan signal and a data signal to sub-pixels formed on the display panel, the selected sub-pixel transmits light or emits light directly, thereby displaying an image. Hereinafter, the description of the present d will be continued with respect to the liquid crystal display device and the organic light emitting display device. Meanwhile, the present disclosure described below is also applicable to a display device that is based on an inorganic light emitting diode rather than an organic light emitting diode.

Figure 1:
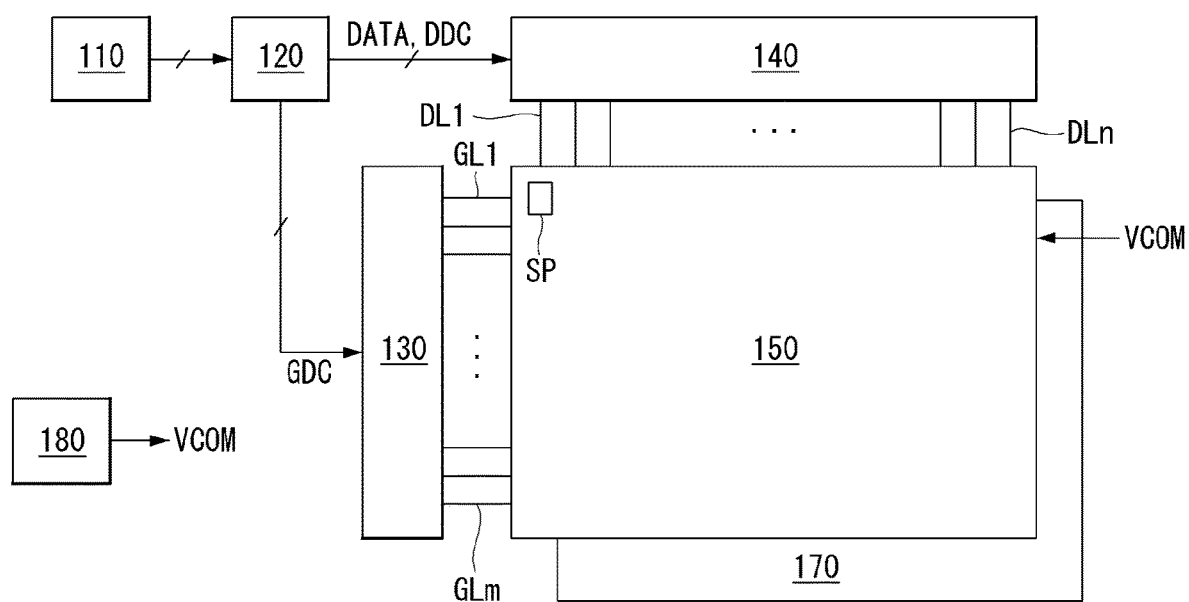
FIG. 1 is a block diagram schematically illustrating a liquid crystal display according to one embodiment.
Figure 2:
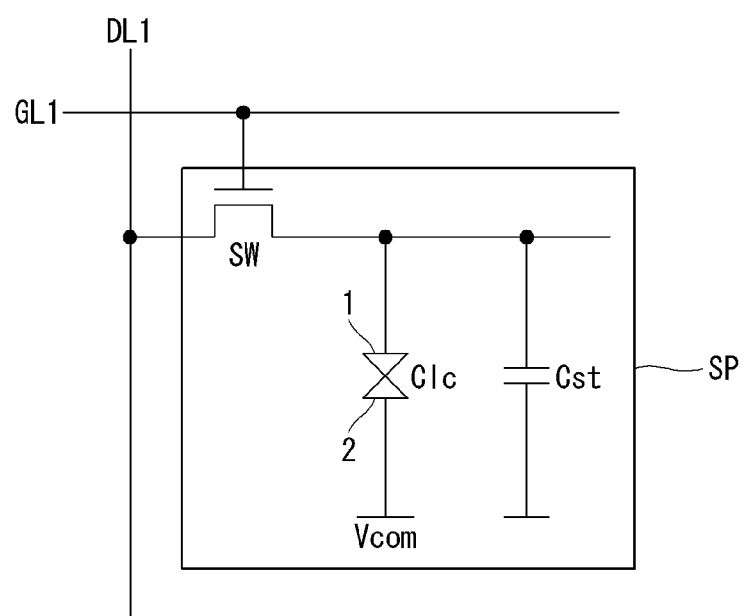
FIG. 2 is a circuit diagram schematically illustrating a sub-pixel shown in FIG. 1 according to one embodiment.

FIG. 1 is a block diagram schematically illustrating a liquid crystal display; and FIG. 2 is a circuit diagram schematically illustrating a sub-pixel shown in FIG. 1.

As shown in FIGS. 1 and 2, the liquid crystal display device includes an image supplier 110, a timing controller 120, a scan driver 130, a data driver 140, a display panel 150, and a backlight unit 170, a power supply unit 180, and the like.

The image supplier 110 outputs various driving signals together with image data signals supplied from the outside or image data signals stored in an internal memory. The image supplier 110 supplies data signals and various driving signals to the timing controller 120.

The timing controller 120 outputs a gate timing control signal GDC for controlling operation timing of the scan driver 130, a data timing control signal DDC for controlling operation timing of the data driver 140, various sync signals (vertical sync signal Vsyn and horizontal sync signal Hsync), and the like. The timing controller 120 supplies the data signal DATA supplied from the image processing unit 110 to the data driver 140, together with the data timing control signal DDC.

The scan driver 130 outputs a scan signal (or gate signal) in response to a gate timing control signal GDC supplied from the timing controller 120. The scan driver 130 supplies the scan signal to sub-pixels included in the display panel 150 through gate lines GL1 to GLm. The scan driver 130 is formed in the form of an integrated circuit (IC) or is formed directly on the display panel 150 by a gate in panel method.

The data driver 140 samples and latches the data signal DATA in response to the data timing control signal DDC supplied from the timing controller 120, and converts the data signal into a data voltage in the form of an analog signal corresponding to the gamma reference voltage to be output. The data driver 140 supplies the data voltage to sub-pixels included in the display panel 150 through data lines DL1 to DLn. The data driver 140 may be mounted on the display panel 150 or mounted on a printed circuit board in the form of an integrated circuit (IC), but is not limited thereto.

The power supply unit 180 generates and outputs a common voltage VCOM on the basis of an external input voltage supplied from the outside. The power supply unit 180 generates and outputs a voltage (e.g., scan high voltage, scan low voltage) required for driving the scan driver 130, a voltage (e.g., drain voltage, half drain voltage) required for driving the data driver 140, or the like, in addition to a common voltage VCOM.

The display panel 150 displays an image in response to the scan signal supplied from the scan driver 130, the data voltage supplied from the data driver 140, and the common voltage VCOM supplied from the power supply unit 180. The sub-pixels of the display panel 150 control light provided through the backlight unit 170.

For example, one sub-pixel SP includes a switching transistor SW, a storage capacitor Cst, and a liquid crystal layer Clc. The switching transistor SW has a gate electrode connected to a scan line GL1 and a source electrode connected to a data line DLL The storage capacitor Cst has one end connected to a drain electrode of the switching transistor SW and the other end connected to a common voltage line Vcom. The liquid crystal layer Clc is formed between a pixel electrode 1 connected to the drain electrode of the switching transistor SW and a common electrode 2 connected to the common voltage line Vcom.

The display panel 150 is implemented in a twisted nematic (TN) mode, a vertical alignment (VA) mode, an in-plane switching (IPS) mode, a fringe field switching (FFS) mode, an electrically controlled birefringence (ECB) mode, or the like, according to the structure of the pixel electrode 1 and the common electrode 2.

The backlight unit 170 provides light to the display panel 150 using a light source that emits light. The backlight unit 170 may include a light emitting diode (hereinafter, referred to as LED), an LED driving unit driving the LED, an LED substrate on which LED is mounted, a light guide plate converting light emitted from the LED into a surface light source, a reflector reflecting light from the bottom of the light guide plate, an optical sheet collecting and diffusing light emitted from the light guide plate, and the like, but is not limited thereto.

Figure 3:
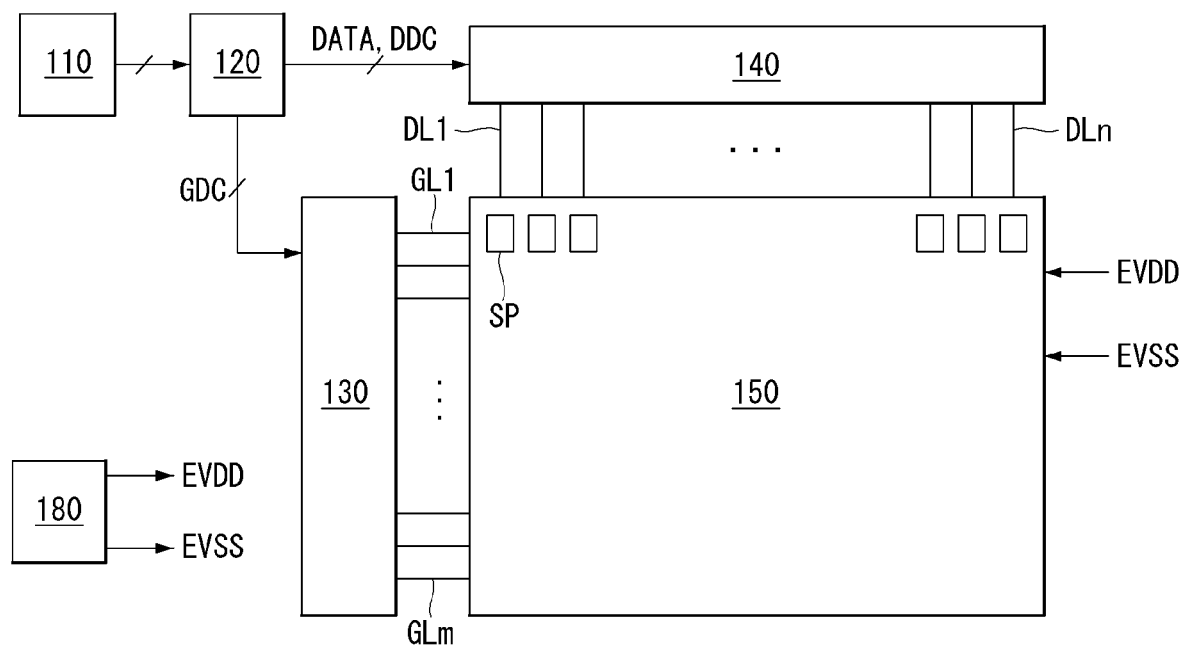
FIG. 3 is a block diagram schematically illustrating an organic light emitting display device according to one embodiment.
Figure 4:
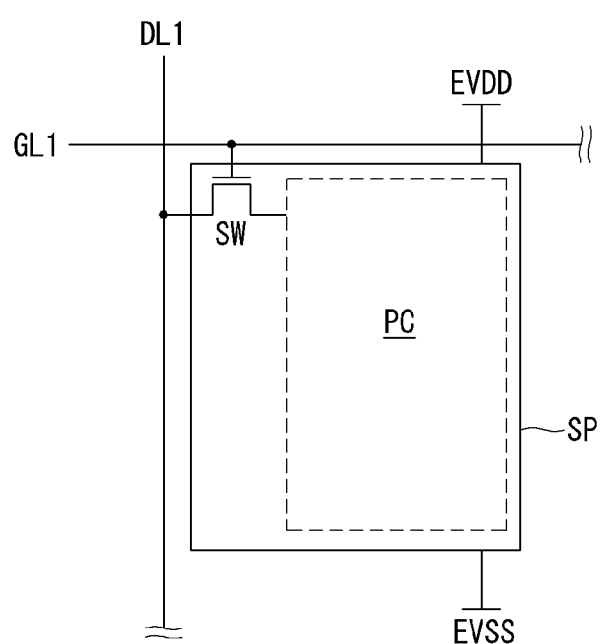
FIG. 4 is a configuration diagram schematically illustrating a sub-pixel shown in FIG. 3 according to one embodiment.

FIG. 3 is a block diagram schematically illustrating an organic light emitting display device; and FIG. 4 is a configuration diagram schematically illustrating a sub-pixel shown in FIG. 3.

As shown in FIGS. 3 and 4, an organic light emitting display device includes an image supplier 110, a timing controller 120, a scan driver 130, a data driver 140, a display panel 150, and a power supply unit 170, and the like.

Since the image supplier 110, the timing controller 120, the scan driver 130, and the data driver 140 included in the organic light emitting display device are similar in basic configuration and operation to those of the liquid crystal display of FIG. 1, detailed description thereof will be omitted. Instead, the power supply unit 180 and the display panel 150 that are distinct from those of the liquid crystal display device will be described in more detail.

The power supply unit 180 generates and outputs a first driving voltage EVDD of high potential and a second driving voltage EVSS of low potential on the basis of an external input voltage supplied from the outside. The power supply unit 180 generates and outputs the first driving voltage EVDD and the second driving voltages EVSS, as well as a voltage (e.g., scan high voltage, scan low voltage) required for driving the scan driver 130, a voltage (e.g., drain voltage, half drain voltage) required for driving the data driver 140, or the like.

The display panel 150 displays an image in response to a driving signal including a scan signal and a data voltage output from a driver including the scan driver 130 and the data driver 140, and the first driving voltage EVDD and the second driving voltage EVSS output from the power supply unit 180. The sub-pixels of the display panel 150 directly emit light.

For example, one sub-pixel SP includes a switching transistor SW, and a pixel circuit PC including a driving transistor, a storage capacitor, and an organic light emitting diode. Since the sub-pixel SP used in the organic light emitting display device emits light directly, the circuit configuration is complicated compared to that of the liquid crystal display device. In addition, a compensation circuit compensating for degradation in the organic light emitting diode that emits light and the driving transistors that supplies driving current to the organic light emitting diode, are complex and varied. Therefore, it is noted that the pixel circuit PC included in the sub-pixel SP is shown in the form of a block.

Figure 5:
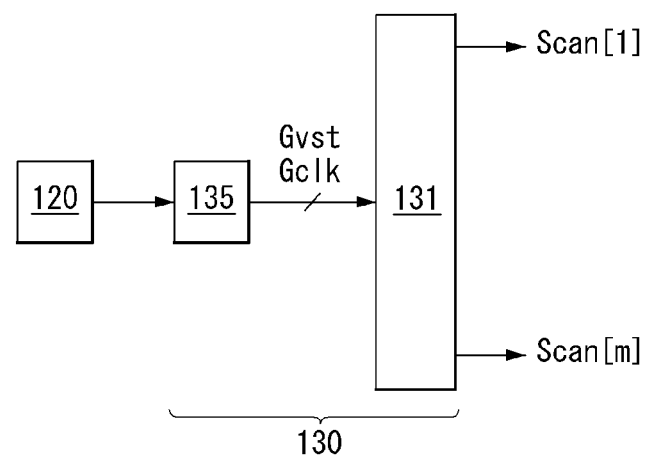
FIG. 5 is an exemplary view illustrating a first configuration of a device associated with a gate-in-panel type scan driver according to one embodiment.
Figure 6:
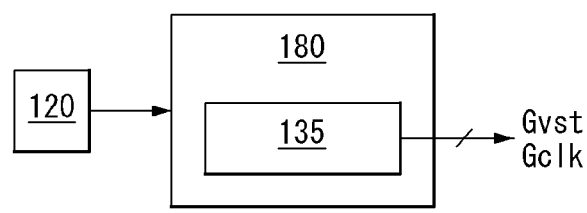
FIG. 6 is an exemplary view illustrating a second configuration of a device associated with a gate-in-panel type scan driver according to one embodiment.
Figure 7A:
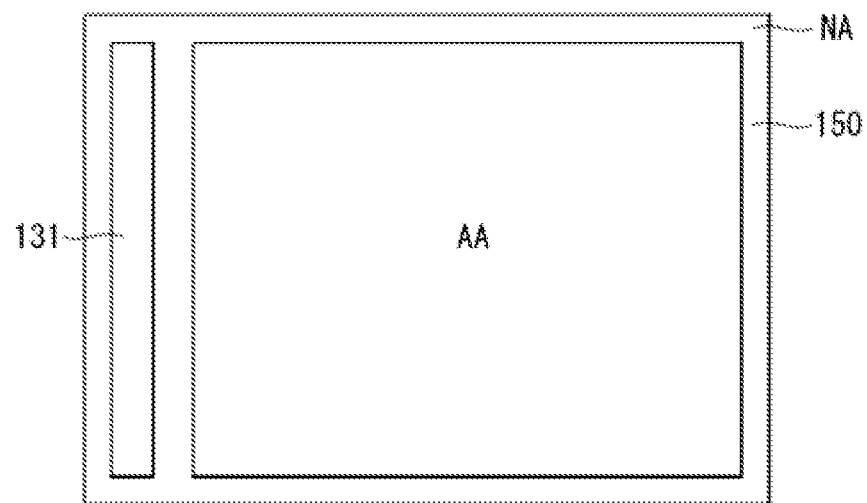
FIGS. 7A and 7B are views illustrating arrangement examples of a gate-in-panel type scan driver according to one embodiment.
Figure 7B:
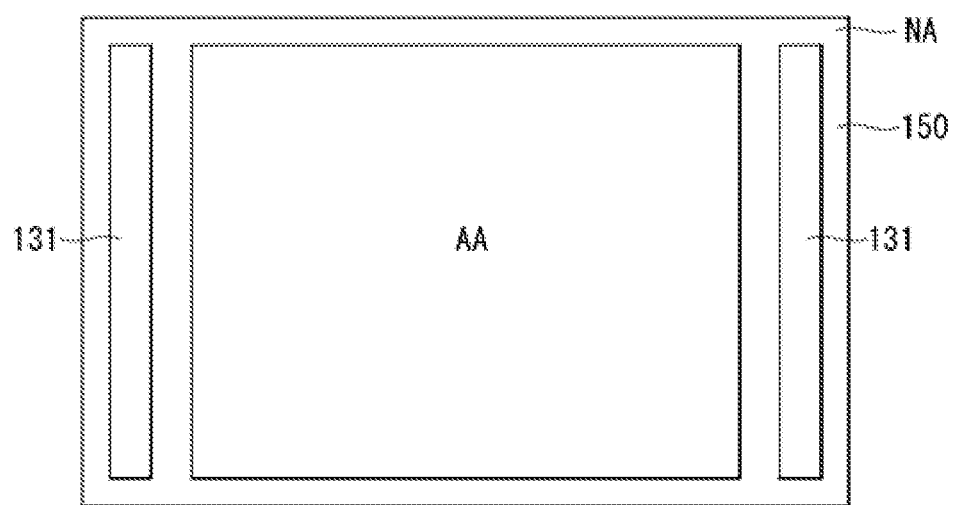

FIG. 5 is an exemplary view illustrating a first configuration of a device associated with a gate-in-panel type scan driver; FIG. 6 is an exemplary view illustrating a second configuration of a device associated with a gate-in-panel type scan driver; and FIGS. 7A and 7B are views illustrating an arrangement example of a gate-in-panel type scan driver.

As shown in FIGS. 5 to 7, the gate-in-panel type scan drivers 131 and 135 may include a shift register circuit 131 (a scan signal generator) and a level shifter 135 (a clock signal and voltage generator).

The level shifter 135 generates and outputs a plurality of clock signals Gclk and a start signal Gvst on the basis of signals output from the timing controller 120. The plurality of clock signals Gclk may be generated and output in the form of K phases (K is an integer of 2 or more) having different phases, such as 2 phases, 4 phases, and 8 phases. The plurality of clock signals Gclk and the start signal Gvst are output through signal pads of the level shifter 135 and transmitted to the shift register circuit 131 through signal lines connected to the signal pads.

The shift register circuit 131 operates on the basis of signals Gclk and Gvst output from the level shifter 135, and outputs scan signals Scan[1] to Scan[m] capable of turning on or off the transistor formed on the display panel. The shift register circuit 131 is formed in the form of a thin film on the display panel by a gate-in-panel method. Therefore, a portion formed on the display panel in the scan driver 130 is a shift register circuit 131.

The shift register circuit 131 is disposed in a non-display area NA of the display panel 150. The shift register circuit 131 may be disposed on a left (or right) side of the non-display area NA of the display panel 150 as shown in FIG. 7A. In addition, the shift register circuit 131 may be disposed in both left and right sides of the non-display areas NA of the display panel 150, as shown in FIG. 7B. However, configurations and arrangements related to the scan drivers 131 and 135 are not limited thereto.

Unlike the shift register circuit 131, the level shifter 135 is formed in the form of an IC. The level shifter 135 may be configured in the form of a separate IC as shown in FIG. 5, or may be included in the power supply unit 180 or other device as shown in FIG. 6.

As such, the shift register circuit 131 outputs the scan signals Scan[1] to Scan[m] on the basis of the plurality of clock signals Gclk and the start signal Gvst output from the level shifter 135.

Figure 8A:
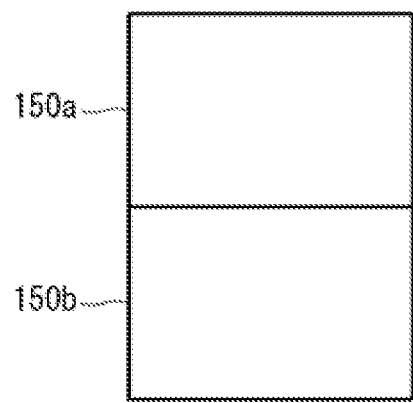
FIGS. 8A and 8B are exemplary views illustrating a video wall display device using the display device described with reference to FIGS. 1 to 7 according to one embodiment.
Figure 8B:
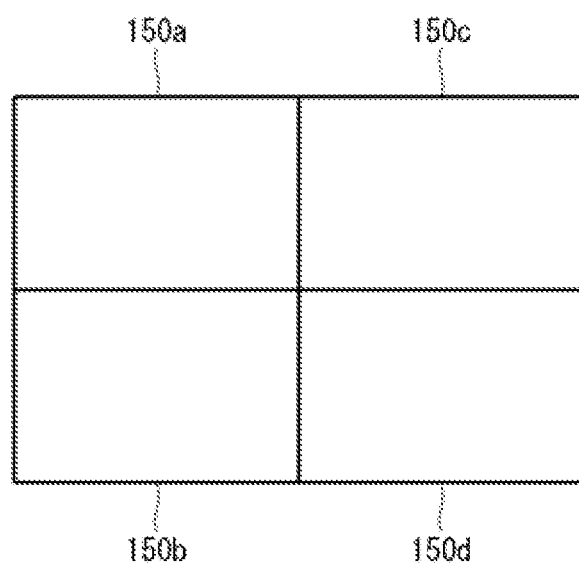

FIGS. 8A and 8B are exemplary views illustrating a video wall display device using the display device described with reference to FIGS. 1 to 7.

The video wall (or multi-vision) display device is used for the purpose of providing a variety of video information in places (indoor/outdoor) that may be used by a large number of specific/unspecified public, such as markets, theaters, art galleries, bookstores, businesses, schools, government offices, hospitals, etc.

The video wall display device may be implemented on the basis of the display devices described above with reference to FIGS. 1 to 7. Since the video wall display device generally has a large screen, it may have at least two display panels. For example, the video wall display device may be implement in such a manner that the two display panels 150a and 150b are arranged vertically as shown in FIG. 8A, or another two display panels 150c and 150d are further arranged in addition to the two display panels 150a and 150b described above, as shown in FIG. 8B.

Figure 9:
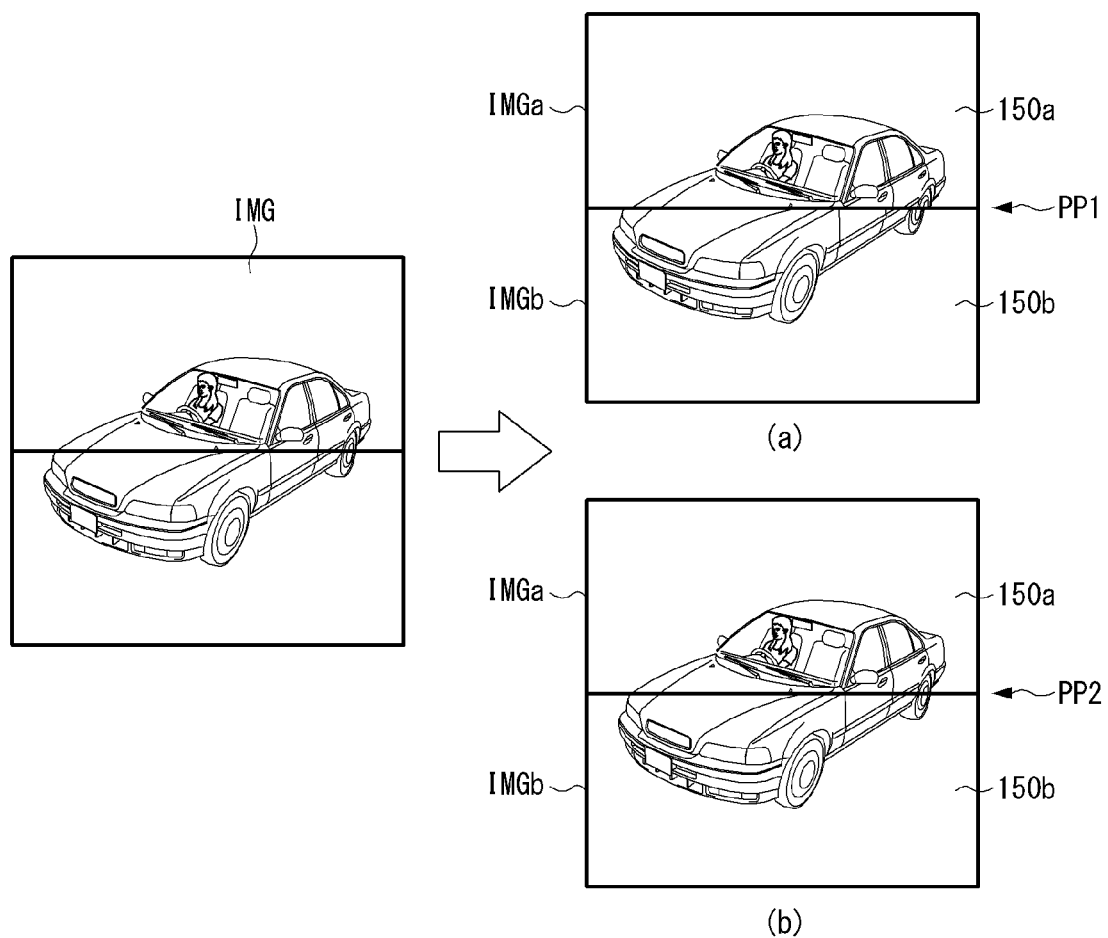
FIG. 9 including part (a) and part (b) are views illustrating considerations when implementing a video wall display device according to one embodiment.
Figure 10:
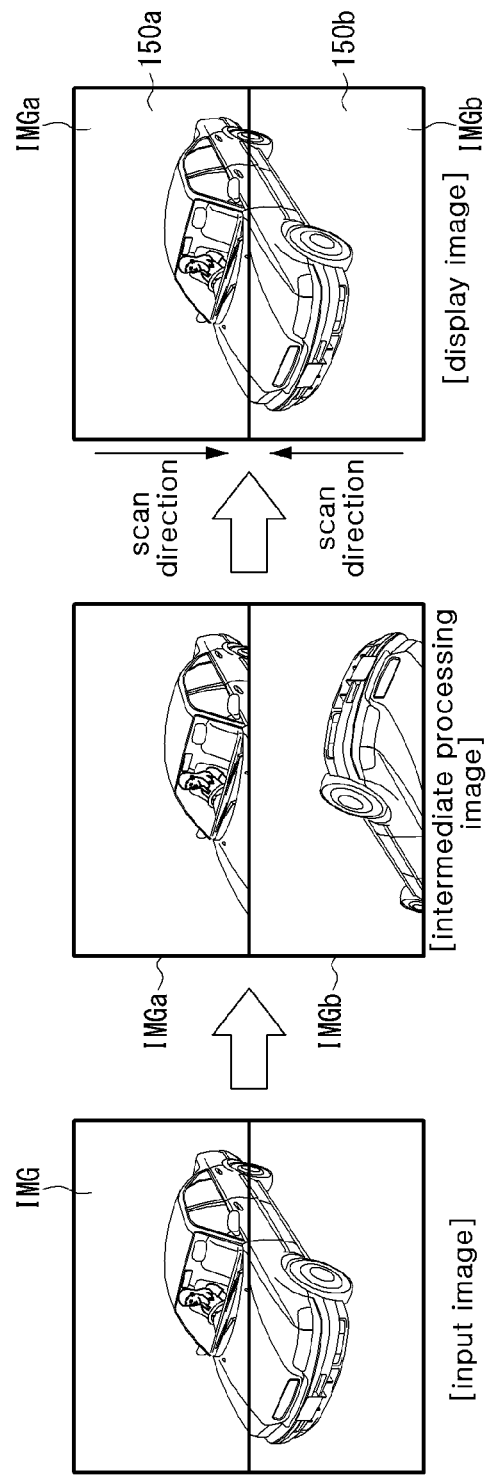
FIG. 10 is a view illustrating a concept of a video wall display device according to an embodiment of the present disclosure.

FIG. 9 is a view illustrating considerations when implementing a video wall display device; and FIG. 10 is a view illustrating a concept of a video wall display device according to an embodiment of the present disclosure.

The number of images to be implemented on one screen of a video wall display device may be one or multiple. However, when one image IMG is displayed on one screen of the video wall as shown in FIG. 9, since one image IMG is divided into multiple sub-images to be displayed on a plurality of display panels, care should be taken so that an image step does not occur.

The image step appears on an interface between two adjacent display panels 150a and 150b, when a first image IMGa, which is a part of the input image IMG, is displayed on the first display panel 150a, and a second image IMGb, which is the remaining part of the input image IMG, is displayed on the second display panel 150b, The image step, such as "PP 1" in part (a) of FIG. 9, is most prominent at a point where an upper image and a lower image meet, which may be explained by a mismatch phenomenon of the upper and lower images. Therefore, when one input image IMG is to be displayed on one screen of the video wall, it is necessary to consider a method capable of resolving an image mismatch phenomenon seen at the point where the upper and lower images meet as shown in "PP1" of part (b) of FIG. 9.

As illustrated in FIG. 10, according to an embodiment of the present disclosure, the first image IMGa (e.g., upper image) of the input image IMG is left as it is, and the second image IMGb (e.g., lower image) undergoes intermediate processing, in order to eliminate the image step. During the intermediate processing, the second image IMGb may be inverted diagonally (or 180 degree rotation/invert screen/z-inversion screen). The intermediate processing process may be performed by the image supplier or the timing controller. The intermediate processing process may be performed in an upside-down or left-right reverse (rotation) manner with respect to the first image IMGa or the second image IMGb, but is not limited thereto.

In addition, when displaying the first image IMGa and the second image IMGb on the two display panels 150a and 150b, scan directions for the two display panels 150a and 150b may be different. When scanning, the scan direction may be selected so that the first image IMGa is displayed in order from top to bottom with respect to the first display panel 150a, and the scan direction may be selected so that the second image IMGb is displayed in order from bottom to top with respect to the second display panel 150b. The scan direction may be determined by a signal output from the power supply unit or the level shifter, but is not limited thereto.

Hereinafter, an apparatus and method capable of minimizing the occurrence of an image step caused due to two display panels 150a and 150b will be described according to an embodiment of the present disclosure.

Figure 11:
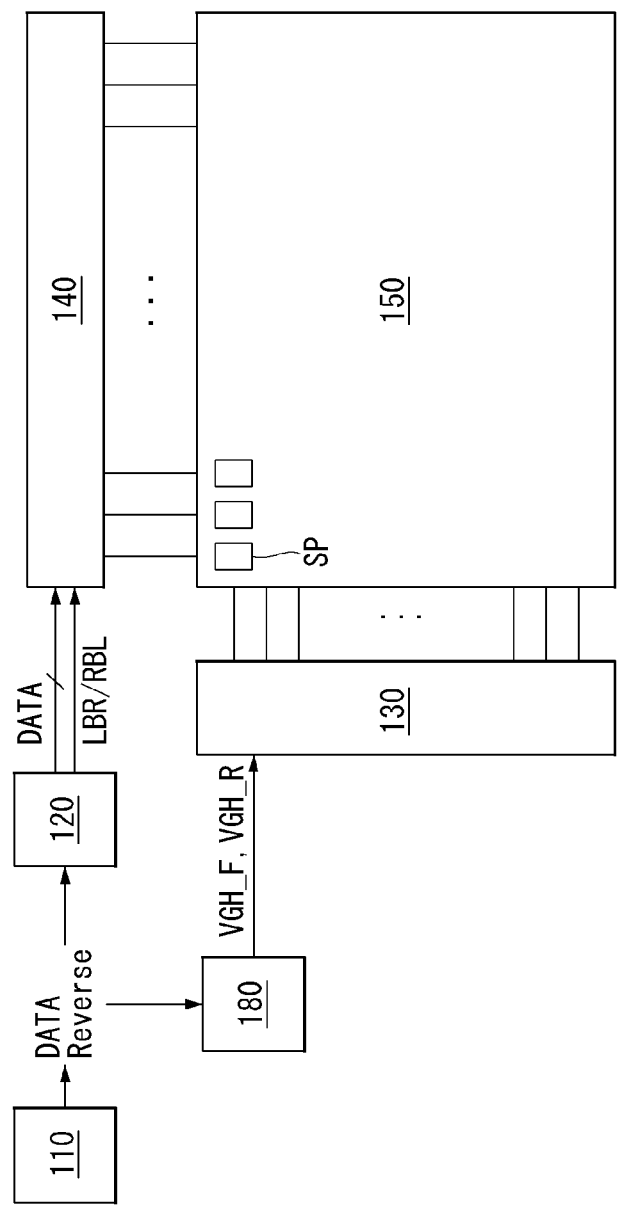
FIG. 11 is a block diagram illustrating a main part of a display device according to an embodiment of the present disclosure.
Figure 12:
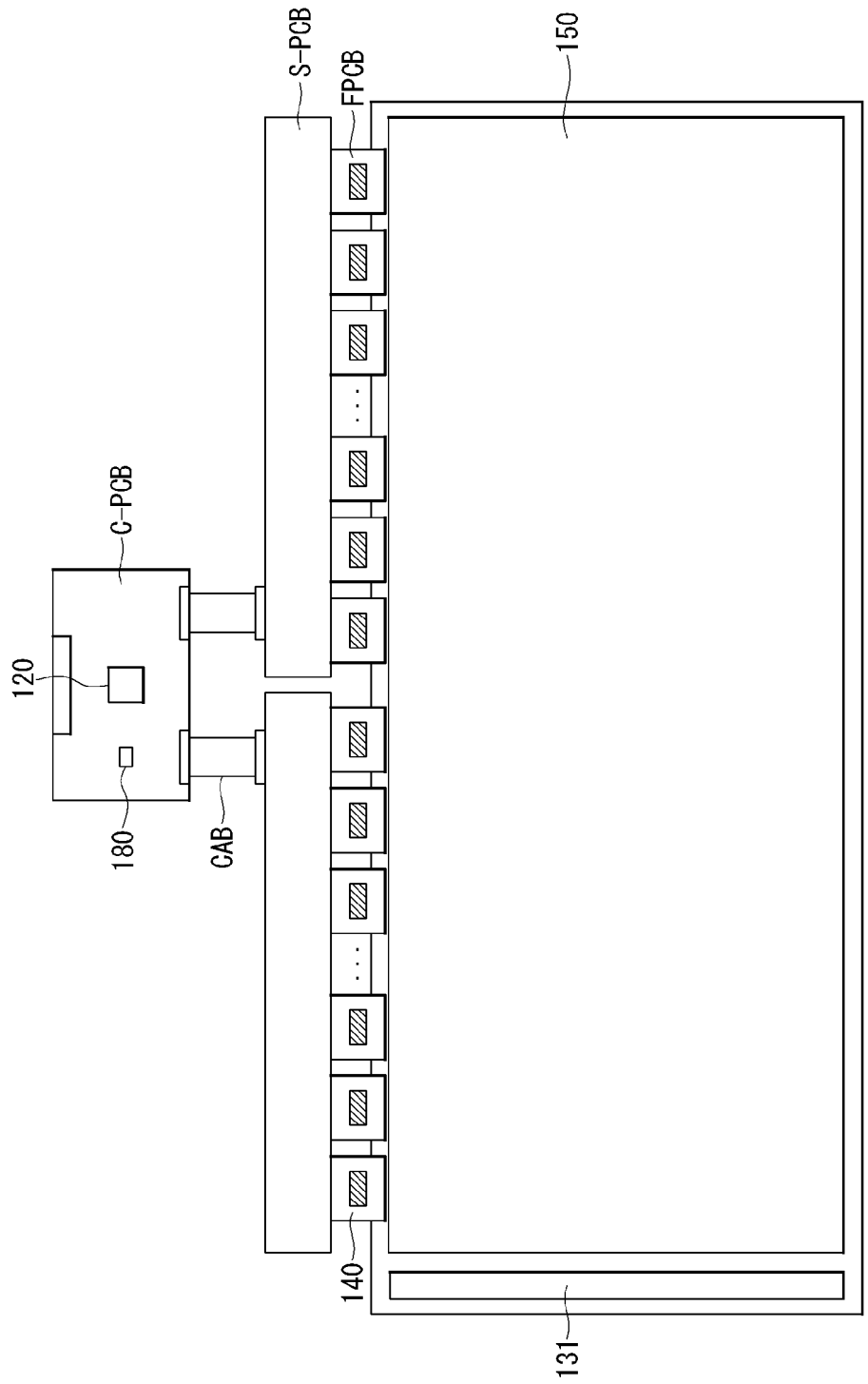
FIG. 12 is a plan view illustrating a display module provided on the basis of a device shown in FIG. 11 according to one embodiment.

FIG. 11 is a block diagram illustrating a main part of a display device according to an embodiment of the present disclosure; and FIG. 12 is a plan view illustrating a display module provided on the basis of a device shown in FIG. 11.

As shown in FIG. 11, the display device according to an embodiment of the present disclosure may include a timing controller 120 changing a data output method of a data driver 140 in response to a reverse signal and a power supply unit 180 (or level shifter) changing the scan direction of a scan driver 130. The reverse signal may be input from the outside, and may be output by an image supplier 110 (or a system or a set).

The timing controller 120 may output a first latch direction change signal LBR or a second latch direction change signal RBL in response to the reverse signal. The data driver 140 may change a latch direction of a data voltage output from itself in response to the first or second latch direction change signal LBR or RBL from the timing controller 120.

The power supply unit 180 may output a first scan direction change signal VGH_F or a second scan direction change signal VGH_R in response to the reverse signal. When the first or second scan direction change signal VGH_F or VGH_R is output from the power supply unit 180, the scan driver 130 may change an output direction of a scan signal output from itself.

Meanwhile, in the above description, it has been described as an example that the first or second scan direction change signal VGH_F or VGH_R is output from the power supply unit 180. However, when the scan driver 130 is composed of a level shifter and a shift register circuit, the first or second scan direction change signal VGH_F or VGH_R may be output from the level shifter.

As illustrated in FIG. 12, the device illustrated in FIG. 11 may be implemented in the form of a display module through an assembly process. One display module may largely include a display panel 150, a flexible circuit board FPCB, a printed circuit board S-PCB, and a control board C-PCB, which will be described in more detail below.

The display panel 150 may have a shift register circuit 131 that outputs the scan signal. The data driver 140 may be mounted on a flexible circuit board FPCB. A plurality of flexible circuit boards FPCB may be provided so that each has the data driver 140 and is provided between the printed circuit board S-PCB and the display panel 150. The printed circuit board S-PCB and the display panel 150 may be electrically connected to each other by the plurality of flexible circuit boards FPCB.

The timing controller 120 and the power supply unit 180 may be mounted on the control board C-PCB. The control board C-PCB and the printed circuit board S-PCB may be electrically connected to each other by a flexible cable CAB provided between them. However, the display module described above is only an example, and the present disclosure is not limited thereto.

Hereinafter, a configuration and a method for changing the output direction of the scan signal will be described.

Figure 13:
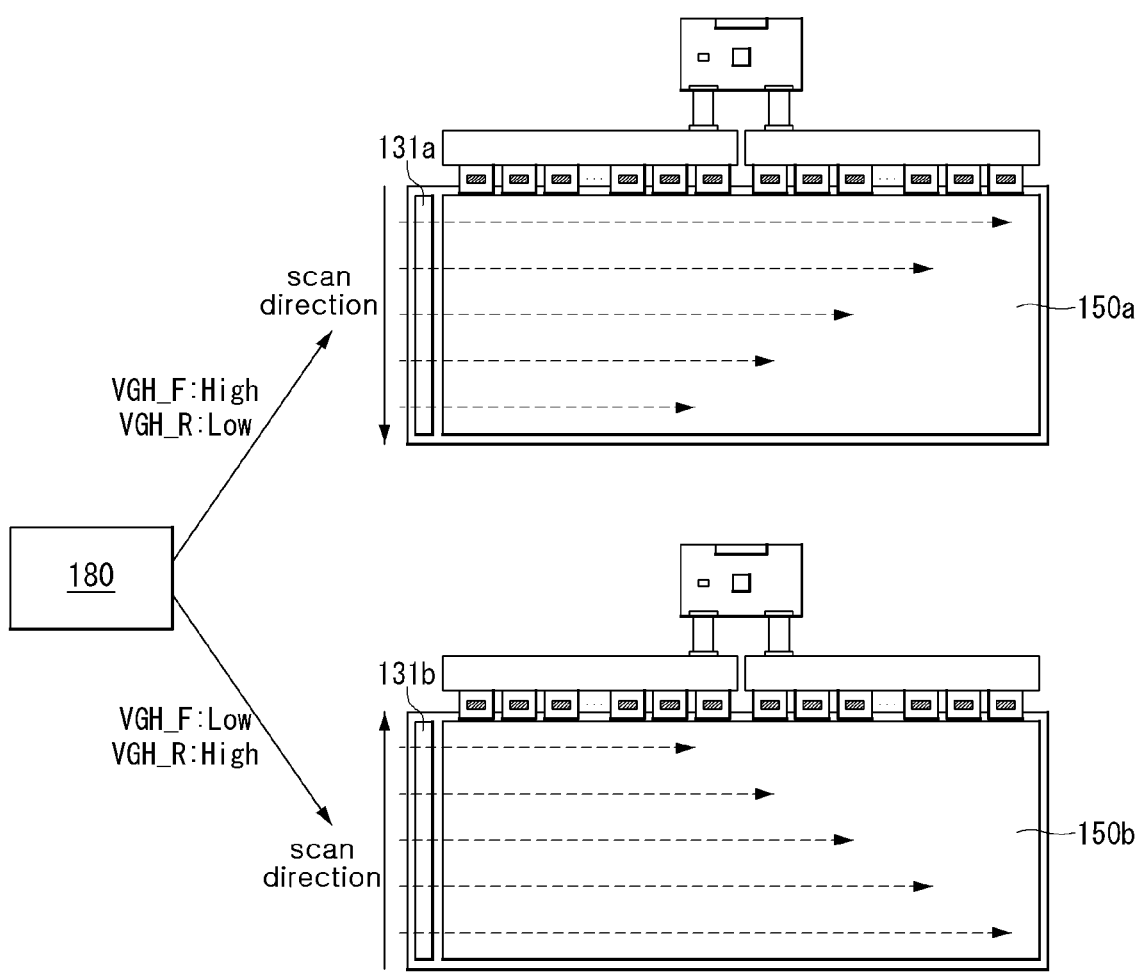
FIG. 13 is a view illustrating that output directions of scan signals for two display panels are different according to one embodiment.
Figure 14:
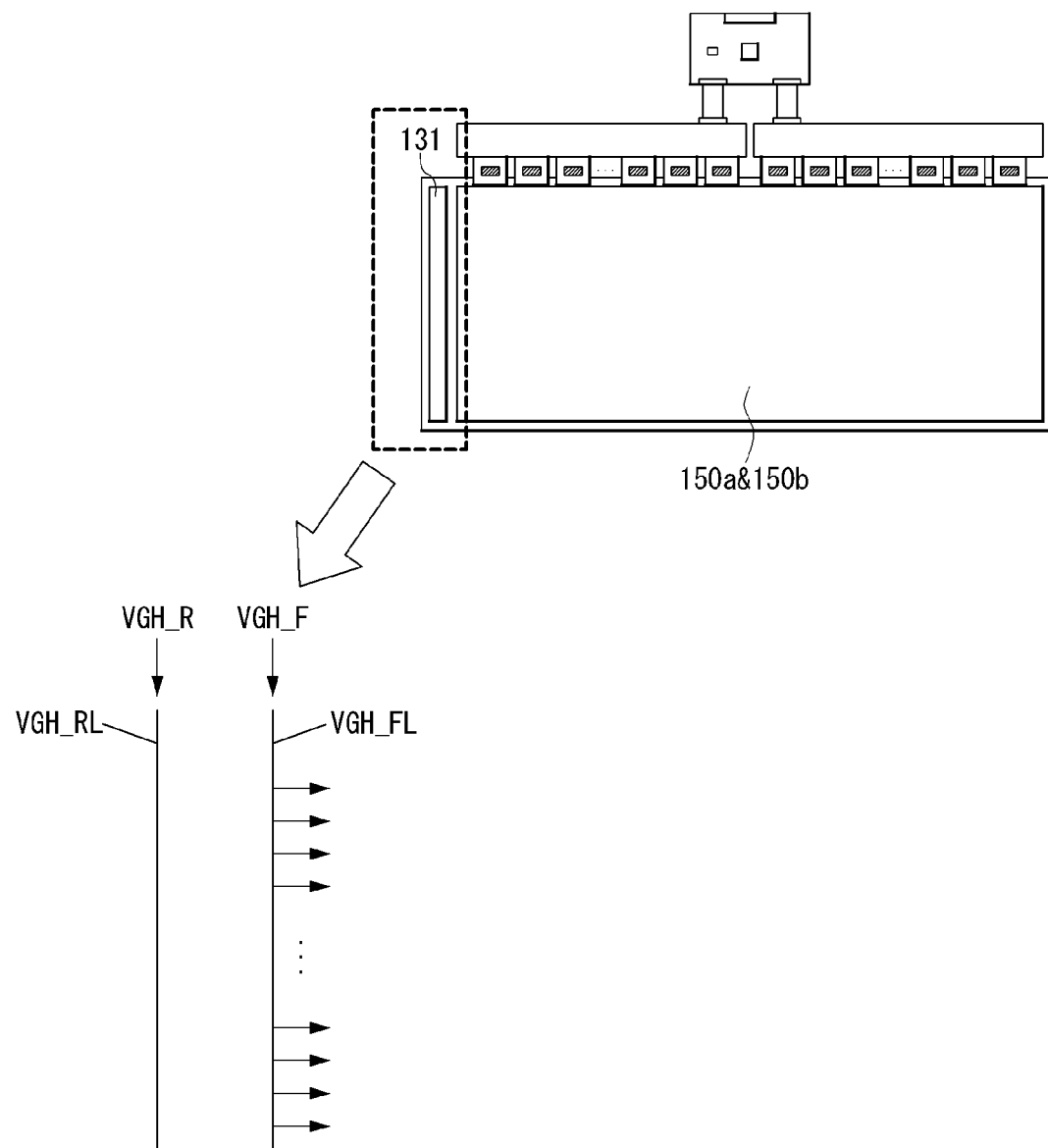
FIG. 14 is an exemplary view illustrating a configuration and a method for changing an output direction of a scan signal according to one embodiment.
Figure 15A:
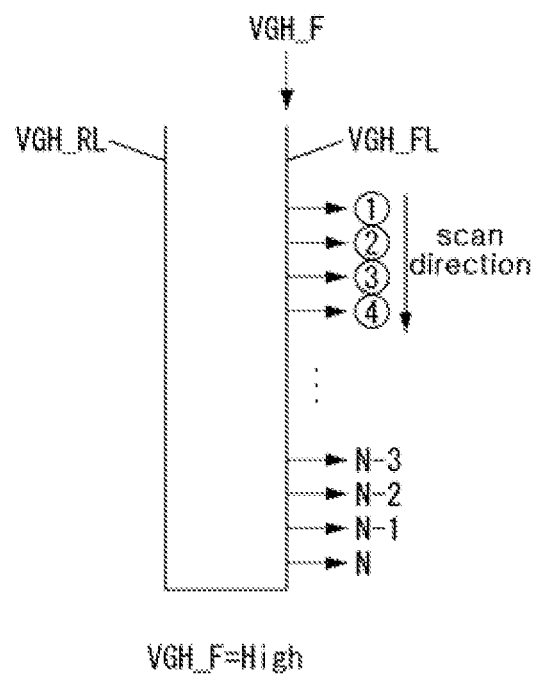
FIGS. 15A and 15B are exemplary views illustrating a configuration and a method for changing an output direction of a scan signal according to one embodiment.
Figure 15B:
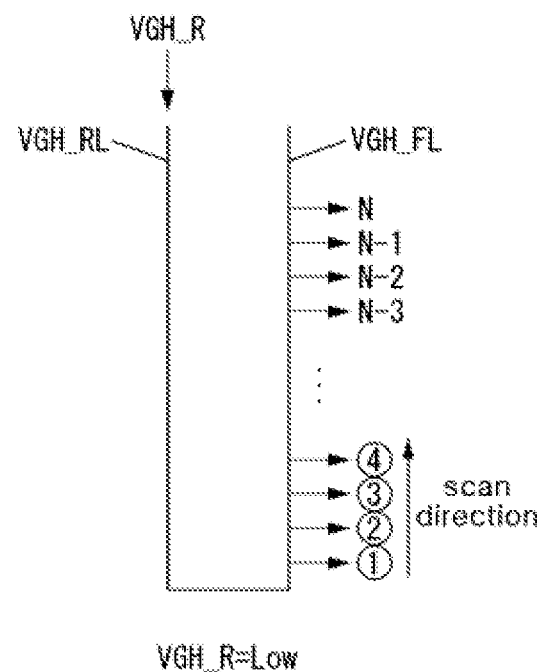

FIG. 13 is a view illustrating that output directions of scan signals for two display panels are different, and FIGS. 14, 15A, and 15B are exemplary views illustrating a configuration and a method for changing the output direction of a scan signal.

As shown in FIG. 13, the first display module having the first display panel 150a may have the scan direction (forward scan) determined so that the scan signal is output by at least one line in order from top to bottom, and the second display module having the second display panel 150b have the scan direction (reverse scan) determined so that the scan signal is output by at least one line in order from bottom to top.

For example, the first display module may output the scan signal in the forward direction, when receiving the first scan direction change signal VGH_F of logic high and the second scan direction change signal VGH_R of logic low from the power supply unit 180 for driving the first display module. In addition, the second display module may output the scan signal in the reverse direction, when receiving the first scan direction change signal VGH_F of logic low and the second scan direction change signal VGH_R of logic high from the power supply unit 180 for driving the second display module.

Meanwhile, since the display module includes the power supply unit 180 for driving itself, VGH_F=High and VGH_R=Low are output from the power supply to drive the first display panel 150a, and VGH_F=Low and VGH_R=High is output from the power supply unit to drive the second display panel 150b.

However, it is noted that only one power supply unit 180 is shown in FIG. 13, in order to emphasize that the scan direction of each of the two display modules may be differently determined in response to logic states of the first and second scan direction change signals VGH_F or VGH_R output from the power supply unit 180.

As shown in FIG. 14, the first and second display modules including the first display panel 150a and the second display panel 150b may include a first scan direction control line VGH_FL and a second scan direction control line VGH_RL connected to a signal input terminal (for example, a terminal to which a voltage or signal for determining a scan direction is input) of the shift register circuit 131, respectively.

The first scan direction control line VGH_FL and the second scan direction control line VGH_RL may be disposed adjacent to the shift register circuit 131 along the length of the shift register circuit 131. In addition, the first scan direction control line VGH_FL and the second scan direction control line VGH_RL are formed with two lines that are spaced from each other and then interconnected to each other at one side (lower side), thereby having a U-shape.

The shift register circuit 131 included in the first and second display modules may perform a forward scan or a reverse scan according to logic states of the first scan direction change signal VGH_F and the second scan direction change signal VGH_R applied through the first scan direction control line VGH_FL and the second scan direction control line VGH_RL. That is, the output direction of the scan signal may be selected from both directions (bi-scans).

As shown in FIG. 14 and FIG. 15A, when the first scan direction change signal VGH_F of logic high is applied through the first scan direction control line VGH_FL, the shift register circuit 131 may output a first scan signal (1), a second scan signal (2), a third scan signal (3), a fourth scan signal (4), and the like in a forward direction from the top. Herein, a logic state of the second scan direction change signal VGH_R applied through the second scan direction control line VGH_RL is logic Low.

As shown in FIG. 14 and FIG. 15B, when the second scan direction change signal VGH_R of the logic Low is applied through the second scan direction control line VGH_RL, the shift register circuit 131 may output a first scan signal (1), a second scan signal (2), a third scan signal (3), a fourth scan signal (4), and the like in a reverse direction from bottom. Herein, a logic state of the first scan direction change signal VGH_F applied through the first scan direction control line VGH_FL is logic High.

According to the above embodiment, the present disclosure arranges the scan direction control lines VGH_FL and VGH_RL in an area where the shift register circuit 131 is located in order to change the output direction of the scan signal. Then, the logic states of the scan direction change signals VGH_F and VGH_R applied through the scan direction control lines VGH_FL and VGH_RL are changed. However, this is only an example, and the present disclosure is not limited thereto.

Hereinafter, a configuration and method of changing the latch direction of the data voltage will be described.

FIGS. 16 and 17 are views illustrating latch directions of data voltages for two display panels are different.

As shown in FIGS. 11, 16, and 17, in the first and second display modules including the first display panel 150a and the second display panel 150b, the latch direction of the data voltage may be changed by the first or second latch direction change signal LBR or RBL output from the first and second timing controllers 120a and 120b (latch direction change for left and right reversal of the data signal).

The latch direction of the data voltage may be determined according to an output direction of the scan signal, positions of the display panels 150a and 150b included in the display module (up, down, left, and right relations), and a type of image to be displayed by the display module. Since only a case in which only two display panels 150a and 150b included in the first and second display modules are located at the upper portion and the lower portion is described according to the present disclosure, two cases including displaying the upper image and displaying the lower image will be described below.

As shown in FIGS. 11 and 16, since the first display panel 150a displays the upper image, the scan direction of the scan signal may be determined as the forward direction. That is, the shift register circuit 131b of the first scan driver driving the first display panel 150a may output the scan signal in a forward direction by a scan direction change signal output from the first power supply unit 180a. In addition, the first data driver 140a latches the data signal in the order from left to right (first direction) in response to the first latch direction change signal LBR output from the first timing controller 120a, and then transmits the data signal into a data voltage to be output.

As a result, the first display panel 150a may display the upper image on the basis of the scan signal applied in the forward direction and the data voltage that is latched in the order from left to right and then output. That is, the first display module including the first display panel 150a is driven according to a first driving method, which is a general driving method, to display the upper image.

According to the foregoing, the first data driver 140a may latch the data signal in the order from left to right (forward latch) to be output, in response to the first latch direction change signal LBR. More specifically, when the first latch direction change signal LBR is input, the first data driver 140a latches the data signal output from the first timing controller 120a in a forward order from left to right from the first output channel to the Nth output channel (last channel), and then converts the data signal into a data voltage to be simultaneously output through all channels.

As shown in FIGS. 11 and 17, since the second display panel 150b displays the upper image, the scan direction of the scan signal may be determined as the reverse direction. That is, the shift register circuit 131b of the second scan driver driving the second display panel 150b may output the scan signal in the reverse direction by the scan direction change signal output from the second power supply unit 180b. In addition, the second data driver 140b may latch the data signal in the order from right to left (second direction opposite to the first direction) in response to a second latch direction change signal RBL output from the second timing controller 120b, and convert the data signal into a data voltage to be output.

As a result, the second display panel 150b may display the lower image on the basis of the scan signal applied in the reverse direction and the data voltage that is latched in the order from right to left and then output. That is, the second display module including the second display panel 150b is driven in a second driving method, which is different from a general driving method, to display the lower image.

According to the above description, the second data driver 140b may latch the data signal in the order from the right to the left (reverse latch) to be output, in response to the second latch direction change signal RBL. More specifically, when the second latch direction change signal RBL is input, the second data driver 140b latches the data signal output from the second timing controller 120b in a reverse order from right to left from the Nth output channel (last channel) to the first output channel and then converts the data signal into a data voltage to be simultaneously output through all channels.

Referring to FIGS. 16 and 17, the upper image may be displayed on the first display panel as it is by the first driving method, whereas the lower image may be re-inverted diagonally by the second driving method (or the image that has undergone 180 degree rotation is restored to the original image) and displayed on the second display panel.

FIGS. 18A and 18B are views illustrating an example of implementation of a video wall display device using an image control method according to an embodiment of the present disclosure; and FIG. 19 is a view illustrating an implementation of a video wall display device without using an image control method according to an embodiment of the present disclosure.

As shown in FIGS. 11 and 18A according to the image control method (Z-inversion screen control) of the embodiment, the first display panel 150a is scanned in the forward direction and the data signal corresponding to the upper image IMGa are latched in the forward order and then is converted to a data voltage to be applied to the first display panel 150a. At the same time, the second display panel 150b is scanned in the reverse direction, and the data signal corresponding to the upper image IMGb is latched in a reverse order and then is converted to a data voltage to be applied to the second display panel 150b.

Herein, both the upper image IMGa and the lower image IMGb displayed on an interface between the first display panel 150a and the second display panel 150b are displayed for the same timing, for example, N frame.

Therefore, when the image control method according to an embodiment of the present disclosure is used, both the upper image IMGa and the lower image IMGb displayed on the interface of the first display panel 150a and the second display panel 150b are displayed during the same timing. As a result, the video wall display device including the two display panels 150a and 150b may block an image step that may be caused to be adjacent to the interface (refer to a PP2 in FIG. 18B). In addition, even when the image step occurs, the effect thereof can be minimized.

As shown in FIGS. 11, 19A, when the image control method of the embodiment is not followed, the first display panel 150a and the second display panel 150b are scanned in the forward direction, and the data signals corresponding to the upper image IMGa and the lower image IMGb are latched in the forward order and then converted to data voltages to be applied to the first display panel 150a and the second display panel 150b, respectively.

Herein, the upper image IMGa and the lower image IMGb respectively displayed on the interface between the first display panel 150a and the second display panel 150b is displayed for different timings, for example, N frame in the case of the lower image and N+1 frame in the case of the upper image.

Therefore, when the image control method according to the embodiment of the present disclosure is not used, the upper image IMGa and the lower image IMGb displayed on the interface between the first display panel 150a and the second display panel 150b are displayed for different timings. As a result, the video wall display device including the two display panels 150a and 150b cannot block an image step that may be caused to be adjacent to the interface (refer to a part PP1 in FIG. 19B).

Figure 20:
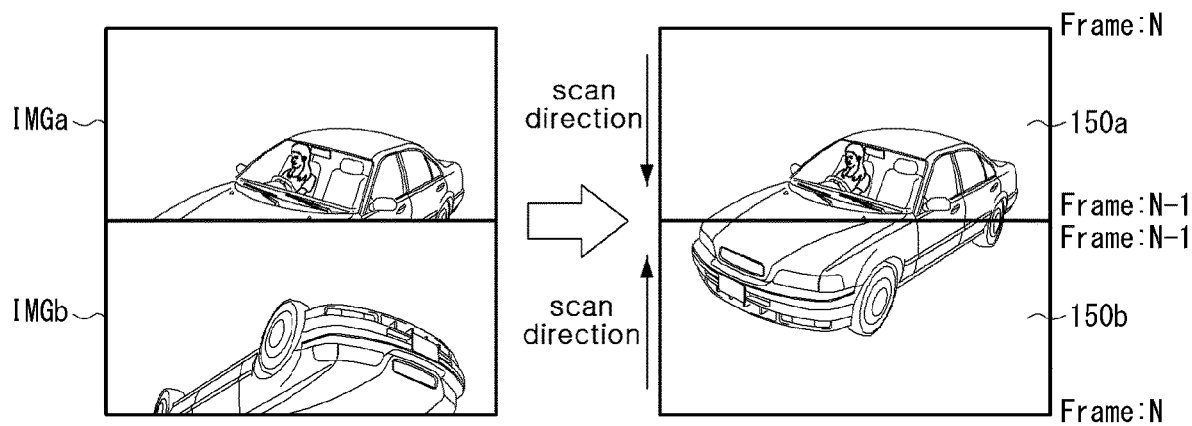
FIGS. 20 and 21 are views illustrating an image control method according to an embodiment of the present disclosure.
Figure 21:
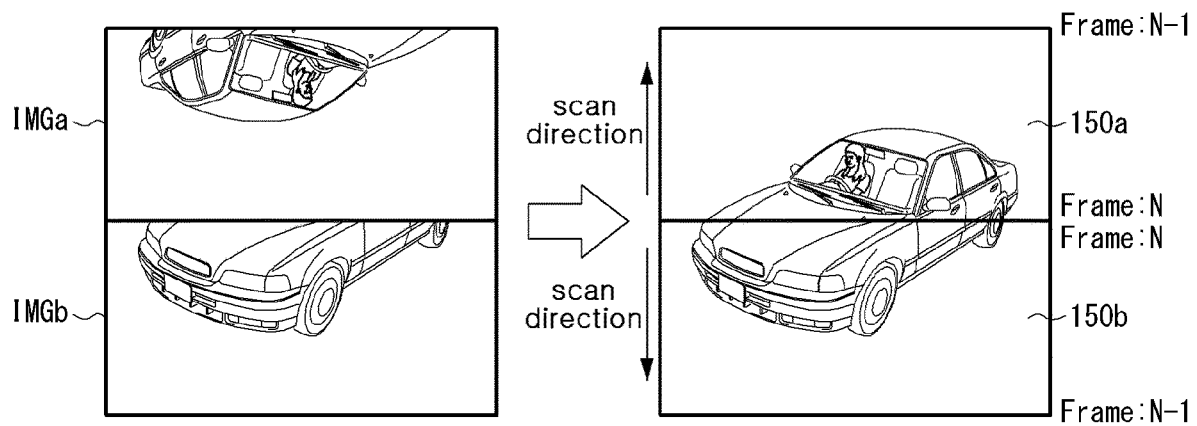

FIGS. 20 and 21 are views illustrating an image control method according to an embodiment of the present disclosure.

Referring to FIG. 20, in order to eliminate the image step, the scan direction and the latch direction of the upper image IMGa to be displayed on the first display panel 150a are not changed (using the first driving method), but the scan direction and the latch direction of the lower image IMGb to be displayed on the second display panel 150b are changed (using the second driving method).

However, referring to FIG. 21, the image control method according to an embodiment of the present disclosure, in order to solve the image step, the scan direction and latch direction of the upper image IMGa to be displayed on the first display panel 150a is changed (using the second driving method), and the scan direction and the latch direction of the lower image IMGb to be displayed on the second display panel 150b may not be changed (using the first driving method).

As can be seen from FIGS. 20 and 21, even when using either of the two methods, since both images displayed on the interface between the upper image IMGa to be displayed on the first display panel 150a and the lower image IMGb to be displayed on the second display panel 150b are completely displayed for the same frame (N−1 frame in FIG. 20, N frame in FIG. 21), thereby preventing from causing the image step. More specifically, the upper image IMGa to be displayed on the first display panel 150a and the lower image IMGb to be displayed on the second display panel 150b have the same start time point or end time point of the frame.

Figure 22:
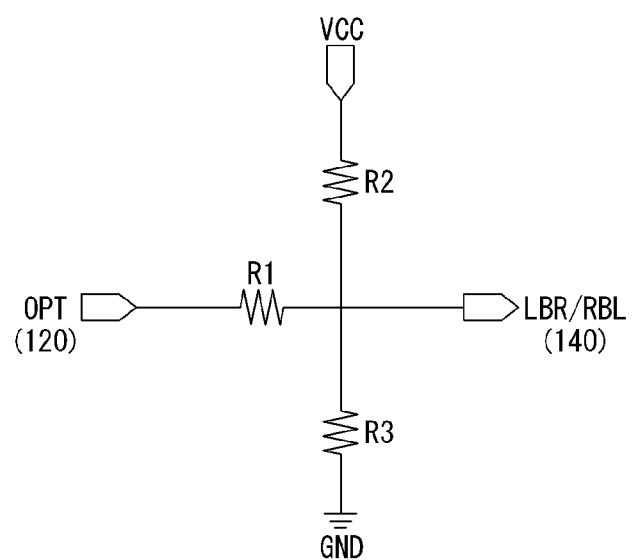
FIGS. 22 and 23 are views illustrating a wiring layout for implementing an image control method according to an embodiment of the present invention.
Figure 23:
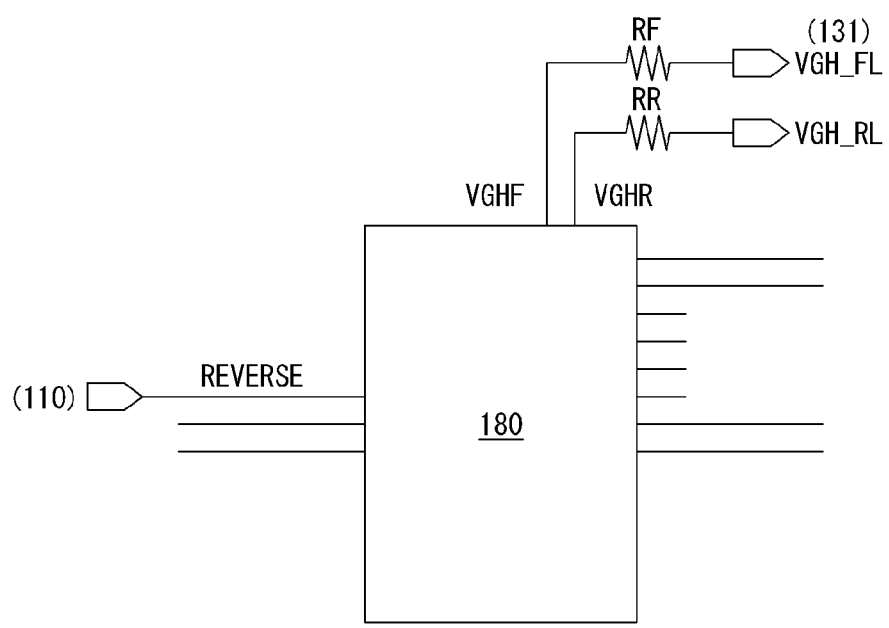

FIGS. 22 and 23 are views illustrating a wiring layout for implementing an image control method according to an embodiment of the present disclosure.

As shown in FIGS. 11 and 22, the timing controller 120 may apply the first latch direction change signal LBR or the second latch direction change signal RBL to the data driver 140. To this end, the timing controller 120 may include an option terminal OPT for outputting the first latch direction change signal LBR or the second latch direction change signal RBL. In addition, the data driver 140 may include a latch direction change signal terminal LBR/RBL capable of receiving the first latch direction change signal LBR or the second latch direction change signal RBL.

The option terminal OPT of the timing controller 120 and the latch direction change signal terminals LBR/RBL of the data driver 140 may be connected to resistors R1 to R3 and voltage lines VCC and GND for the purpose of stable output/transmission of the signal. For example, between the option terminal OPT of the timing controller 120 and the latch direction change signal terminal LBR/RBL of the data driver 140, a separate signal line connecting both terminals and a first resistor R1 connected to one side or the other side of the signal line may be located. In addition, the second resistor R2 and the third resistor R3 connected to the voltage lines VCC and GND may be located between the first resistor R1 and the latch direction change signal terminal LBR/RBL of the data driver 140. The second resistor R2 has one side connected to the first voltage line VCC and the other side to the signal line, and the third resistor R3 has one side connected to the second voltage line GND and the other side connected to the signal line. In addition, at least one of the resistors R1 to R3 may have an open state (removed state) depending on whether or not the option terminal OPT of the timing controller 120 is used.

As shown in FIGS. 11 and 23, the power supply unit 180 may output the first scan direction change signal VGH_F or the second scan direction change signal VGH_R in response to the reverse signal output from the image supplier 110. To this end, the power supply unit 180 may include a reverse signal terminal REVERSE capable of receiving the reverse signal REVERSE and a first scan direction change signal terminal VGHF and a second scan direction change signal terminal VGHR capable of outputting the first scan direction change signal VGH_F and the second scan direction change signal VGH_R.

The first scan direction change signal terminal VGHF and the second scan direction change signal terminal VGHR of the power supply unit 180 may be connected to the first scan direction control line VGH_FL and the second scan direction control line VGH_RL of the shift register circuit 131, respectively. Resistors RF and RR capable of stable output/transmission of the signal may be located between the first scan direction change signal terminal VGHF and the first scan direction control line VGH_FL, and between the second scan direction change signal terminal VGHR and the second scan direction control line VGH_RL.

As described above, when implementing a video wall (or multi-vision) display device that divides an image into a plurality of images to be displayed on a plurality of display panels, the present disclosure has an effect of reducing the occurrence of an image step between the upper image and the lower image, thereby improving the display quality. In addition, the present disclosure has an effect wherein the frame difference between the upper image and the lower image can be improved on the basis of the image control method (Z-inversion screen control) that selects an output direction of the scan signal from both directions (Bi-scan) and changes the latch direction of the data voltage.

As described above, according to various embodiments of the present disclosure, when implementing a video wall (or multi-vision) display device that divides a single image into a plurality to be displayed on a plurality of display panels, there is an effect that an image step between the upper image and the lower image is prevented, thereby improving the display quality. In addition, according to embodiments of the present disclosure, there is an effect wherein the frame difference between the upper image and the lower image can be improved on the basis of the image control method (Z-inversion screen control) that selects an output direction of the scan signal from bidirectional scans (Bi-scan) and changes the latch direction of the data voltage.

The embodiments of the present disclosure have been described above with reference to the accompanying drawings, but it will be understood that the technical configuration of the present disclosure described above may be practiced in other specific forms without changing the technical spirit or essential features of the present disclosure by those skilled in the art to which the present disclosure pertains. Therefore, the embodiments described above are to be understood in all respects as illustrative and not restrictive. In addition, the scope of the invention is indicated by the claims below, rather than the detailed description. In addition, all modifications or variations derived from the meaning and scope of the claims and their equivalent concepts should be construed as being included in the scope of the present invention.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
   a first display panel and a second display panel displaying one image including a first image portion and a second image portion in a division manner during a frame, the first image portion displayed on the first display panel and the second image portion displayed on the second display panel;
   a first data driver and a second data driver, the first data driver supplying first data voltages corresponding to the first image portion to the first display panel during the frame, and the second data driver supplying second data voltages corresponding to the second image portion that is inverted with respect to the first image portion to the second display panel during the frame;

a first scan driver and a second scan driver supplying scan signals to the first display panel and the second display panel through scan lines during the frame, respectively; and a first timing controller and a second timing controller controlling the first data driver and the second data driver and the first scan driver and the second scan driver during the frame, respectively, wherein the second timing controller is configured to invert the second image portion with respect to the first image portion;

wherein the first data driver latches a first data signal that corresponds to the first image portion and is output from the first timing controller in a first direction during the frame and then converts the first data signal to the first data voltages to be outputted during the frame, and the second data driver latches a second data signal that corresponds to the inverted second image portion and is output from the second timing controller in a second direction opposite to the first direction during the frame and then converts the second data signal to the second data voltages to be outputted during the frame, wherein each of the first scan driver and the second scan driver include:
- a first scan direction control line receiving a first scan direction change signal at a first end of the first scan direction control line but not a second scan direction change signal, and the scan lines are connected to the first scan direction control line; and
- a second scan direction control line spaced apart from the first scan direction and receiving the second scan direction change signal but not the first scan direction change signal at a first end of the second scan direction control line,
- wherein a second end of the first scan direction control line and a second end of the second scan direction control line are interconnected to form a U-shape; and
- wherein one of the first scan direction change signal and the second scan direction change signal is selectively applied to the first scan direction control line or the second scan direction control line to control a scan direction that the scan lines are outputted through the scan lines.

2. The display device of claim 1, wherein the first scan driver outputs the scan signal in a forward direction during the frame, and the second scan driver outputs the scan signal in a reverse direction during the frame.

3. The display device of claim 2, wherein the first scan driver and the second scan driver have scan directions depending on logic states of a first scan direction change signal and a second scan direction change signal supplied from outside.

4. The display device of claim 1, wherein the first data driver and the second data driver have latch directions of data signals depending on the first latch direction change signal and the second latch direction change signal supplied from the first timing controller and the second timing controller.

5. The display device of claim 1, wherein the first display panel and the second display panel are disposed vertically adjacent to each other.

6. A display device, comprising:

at least two display panels including a first display panel and a second display panel, the first display panel and the second display panel displaying one image including a first image portion and a second image portion in a division manner during a frame, the first image portion displayed on the first display panel and the second image portion displayed on the second display panel;

at least two timing controllers including a first timing controller connected to the first display panel but not the second display panel, and a second timing controller connected to the second display panel but not the first display panel, the first timing controller outputting a first data signal that corresponds to the first image portion, and the second timing controller inverting the second image portion with respect to the first image portion and outputting a second data signal that corresponds to the inverted second image portion;

at least two data drivers including a first data driver connected to the first display panel but not the second display panel, and a second data driver connected to the second display panel but not the first display panel, the first data driver converting the first data signal that corresponds to the first image portion and output from the first timing controller into first data voltages to be output to the first display panel during the frame, and the second data driver converting the second data signal that corresponds to the inverted second image portion and is output from the second data driver into second data voltages to be output to the second display panel during the frame; and at least two scan drivers including a first scan driver connected to the first display panel but not the second display panel, and a second scan driver connected to the second display panel but not the first display panel, the first scan driver applying a first scan signal to the first display panel such that the first data voltages are applied to the first display panel but not the second display panel during the frame, and the second scan driver applying a second scan signal to the second display panel such that the second data voltages are applied to the second display panel but not the first display panel during the frame, wherein the first scan driver outputs the first scan signal in a forward direction during the frame, and the second scan driver outputs the second scan signal in a reverse direction from the forward direction during the frame, and wherein the first data driver latches the first data signal in a first direction during the frame and outputs the latched first data signal in the first direction during the frame, and the second data driver latches the second data signal in a second direction opposite to the first direction during the frame and outputs the latched second data signal in the second direction during the frame, wherein each of the first scan driver and the second scan driver include:
- a first scan direction control line receiving a first scan direction change signal at a first end of the first scan direction control line but not a second scan direction change signal, and the scan lines are connected to the first scan direction control line; and
- a second scan direction control line spaced apart from the first scan direction and receiving the second scan direction change signal but not the first scan direction change signal at a first end of the second scan direction control line, wherein a second end of the first scan direction control line and a second end of the second scan direction control line are interconnected to form a U-shape; and wherein one of the first scan direction change signal and the second scan direction change signal is selectively applied to the first scan direction control line or the second scan direction control line to control a scan direction that the scan lines are outputted through the scan lines.

7. The display device of claim 6, wherein the at least two scan drivers have scan directions depending on logic states of first and second scan direction change signals output from at least two power supply units.

8. The display device of claim 6, wherein a separate signal line for changing a latch direction of the data signal is disposed between the at least two data drivers and the at least two timing controllers.

9. A driving method of a display device, the method comprising:

outputting a first data signal and a second data signal to display one image in a division manner on each of a first display panel and a second display panel during a frame, the one image including a first image portion and a second image portion and the second data signal corresponding to the second image portion;

converting, during intermediate processing of the image, the first data signal into first data voltages that correspond to the first image portion during the frame and converting the second data signal into second data voltages that correspond to an orientation of the second image that is inverted with respect to an orientation of the first image portion during the frame and outputting the first data voltages and the second data voltages to the first display panel and the second display panel, respectively during the frame; and outputting, for a display of the image after the intermediate processing, a scan signal to each of the first display panel and the second display panel so that the first data voltages and the second data voltages are separately applied to each of the first display panel and the second display panel during the frame, wherein the outputting of the first data voltages and the second data voltages during the frame is provided so that the first data signal is latched in a first direction during the frame and then converted into the first data voltages to be output to the first display panel during the frame, and the second data signal is latched in a second direction opposite to the first direction during the frame and then converted to the second data voltages to be output to the second display panel during the frame such that the orientation of the second image portion that is displayed on the second display panel during the frame is not inverted with respect to the orientation of the first image portion that is displayed on the first display panel during the frame.

10. The driving method of claim 9, wherein the outputting of the scan signal is provided so that the scan signal includes a forward scan signal and a reverse scan signal, in which the forward scan signal is applied to the first display panel during the frame, and the reverse scan signal is applied to the second display panel during the frame.

11. The driving method of claim 9, wherein a first image and a second image to be displayed on an interface between the at least two display panels are completely displayed during the frame.

* * * * *